United States Patent [19]

Pitner

[11] 4,010,533
[45] Mar. 8, 1977

[54] METHOD OF PRODUCING A TRANSMISSION DEVICE

[75] Inventor: Alfred Pitner, Paris, France

[73] Assignee: Nadella, France; a part interest

[22] Filed: Dec. 4, 1975

[21] Appl. No.: 637,655

[30] Foreign Application Priority Data

Dec. 11, 1974 France .............................. 74.40740

[52] U.S. Cl. ................................... 29/523; 29/525; 64/1 S; 64/23; 285/382.4; 403/277; 403/280; 403/281

[51] Int. Cl.² .................. B21D 39/00; B23P 11/02

[58] Field of Search ............ 29/512, 509, 523, 525, 29/432, 522; 64/1 S, 23; 403/277, 280, 281, 282, 285; 285/382.4

[56] References Cited

UNITED STATES PATENTS

| | | | |
|---|---|---|---|
| 1,548,990 | 8/1925 | Garman | 403/285 |
| 1,684,932 | 9/1928 | Weatherhead | 29/523 UX |
| 1,815,840 | 7/1931 | Frank | 285/382.4 X |
| 2,059,794 | 11/1936 | Jackson | 64/1 S X |
| 2,156,067 | 4/1939 | Rubinstein | 403/282 |
| 2,380,952 | 8/1945 | Dewey | 403/285 X |
| 2,795,039 | 6/1957 | Hutchins | 29/523 X |
| 2,954,495 | 9/1960 | Zeller | 29/523 X |
| 3,188,733 | 6/1965 | Rickard | 29/523 |
| 3,257,502 | 6/1966 | Raudabough | 29/523 X |
| 3,432,916 | 3/1969 | Fisher et al. | 29/523 X |

*Primary Examiner*—Charlie T. Moon
*Attorney, Agent, or Firm*—Robert E. Burns; Emmanuel J. Lobato; Bruce L. Adams

[57] ABSTRACT

The method for producing the transmission device including coupling means connected to a sleeve comprises forming a collar from an apertured blank of the coupling means and cold forming projecting portions on the outer surface of the collar for connecting the collar to rotate with the sleeve. The projecting portions may be formed by expanding the collar in a die from which die the collar is removed before connection to the sleeve. Alternatively, the projecting portions may be formed by radially expanding the collar in the sleeve whose inner surface has projecting portions which form the projecting portions of the collar upon contact with the collar during the expansion of the latter.

14 Claims, 13 Drawing Figures

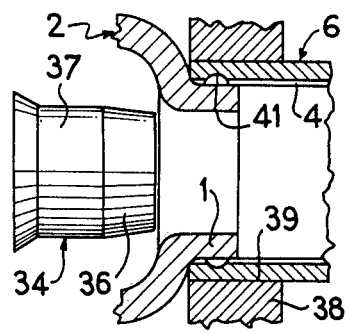
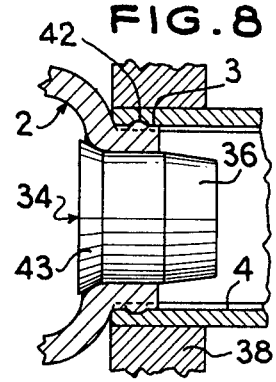
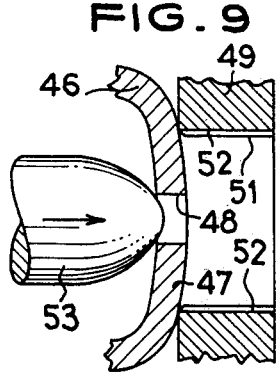
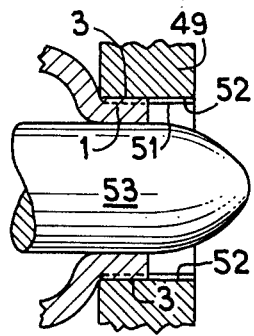
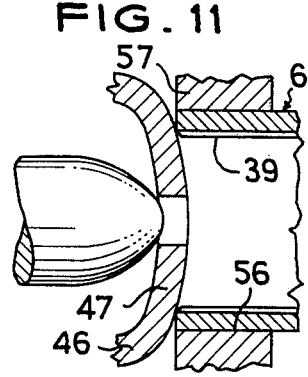
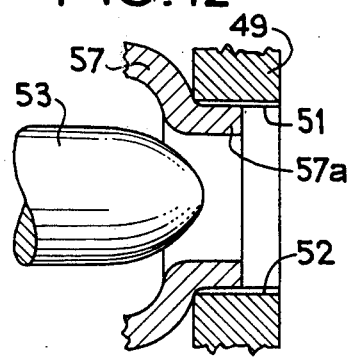
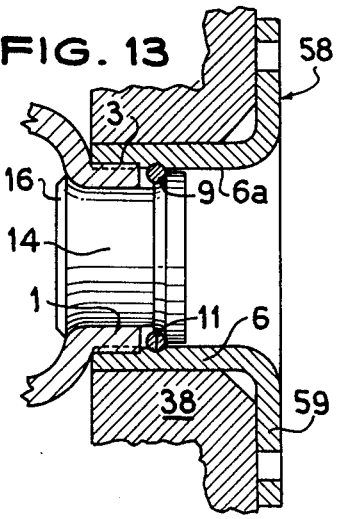

METHOD OF PRODUCING A TRANSMISSION DEVICE

The present invention relates to transmission devices of the type comprising at least one coupling means having a collar having the general shape of a cylinder or a slightly conical shape adapted to be connected to a tubular sleeve for the transmission of motion.

The coupling means is advantageously but not exclusively constituted by a universal joint yoke or a flange, and the tubular sleeve preferably comprises internal splines to connect it to rotate with a splined shaft.

In the latter case, the rotational movement of the shaft can be combined with a movement of translation of the latter with respect to the tubular sleeve, thereby affording a transmission device of variable length.

It is known to construct such a device constituted by a massive path in which the tubular sleeve is coincident with an internally-splined extension of the collar of a universal joint yoke.

According to another known arrangement, such a device is constructed from a universal joint yoke which is assembled with a tubular sleeve by the welding of one end of the latter to the body of the yoke.

The known devices all have the drawback of requiring long and costly operations, such as for example the drilling of a massive part to construct the tubular part and then the provision of internal splines to connect a shaft to rotate with the tubular part.

As concerns devices employing a welding method, they have the same drawback of high cost and also that of a connection whose qualities are not always satisfactory in that a disengagement of the assembled parts is liable to occur with often serious consequences.

Indeed, such devices are subjected to the combined action of a torque and axial tensile forces and it is essential to provide means ensuring, upon assembly, on one hand a connection for transmitting the torque and, on the other hand, an axial connection which enables the device to resist the forces which are exerted in the axial direction.

It is clear that a connection achieved by the welding of the tubular sleeve to the yoke is dangerously stressed in both rotation and traction. Moreover, in mass production, the checking of the quality of the weld results in a substantial increase in the manufacturing cost.

Lastly, for reasons of economy in weight and cost, a well-known method for manufacturing universal joints comprises forming them from sheet metal with a press-formed collar.

This method usually results in a relatively short cylindrical collar owing to the small reserve of material available in a press-forming operation. Such a yoke may be advantageously employed in the arrangement according to the invention which does not require, as do known devices, a yoke having a relatively long collar to ensure, directly or indirectly, the rotational connecton and the axial connection.

An object of the present invention is to overcome the drawbacks of the prior art and to provide a transmission device of the aforementioned type which may employ any type of known yoke, is simple to manufacture and yet ensures a satisfactory connection of the assembled parts.

According to the invention, there is provided a method for producing a transmission device comprising a coupling means, such as a universal joint yoke, provided with a collar adapted to be rendered integral with a tubular sleeve, comprising preparing a blank of the coupling means defining a centre opening, cold forming projecting portions on the outer surface of the part of the blank intended to form the collar by means of a die from which die the collar is withdrawn so as to be rendered integral with the tubular sleeve, or directly in contact with projecting portions pre-formed on the inner surface of the sleeve.

According to one example of the method, the collar is pre-formed in the blank and is initially introduced in the sleeve.

It will be clear that the method according to the invention produces, in a single operation, the collar, if desired, the connecting means, and the intimate connection between the collar and the tubular sleeve.

According to a first modification of the invention, the tubular sleeve comprises at least one circular groove in which the metal is upset in the course of the radial expansion, which ensures the axial interconnection of the sleeve and yoke.

It can be seen that the foregoing arrangement provides simultaneously the rotational connection and the axial connection.

The invention also provides a transmission device wherein the collar has on its outer surface projecting portions produced by cold deformation and engaged with the inner surface of the sleeve whereby the sleeve is connected to rotate with the collar.

In a first embodiment of the device according to the invention, the device comprises a plug having a part having a diameter exceeding the inside diameter of the collar to ensure the radial expansion and the cold deformation of the latter, whereby the aforementioned driving means are obtained subsequent to the insertion of the plug.

Thus the plug radially expands the collar and produces the connecting means which are effective in the axial and/or circumferential direction.

According to another feature of the invention, a first end of the plug extends inside the tubular sleeve on the inner surface of which it is blocked, at least in the axial direction, for example owing to an inner shoulder of the sleeve or a ring disposed in a groove of the sleeve which bears against a part of the plug, whereas a second end of the plug is fixed to the yoke, for example by a forming-over operation.

It will be understood that the tubular sleeve may have splines extending along a large part of its inner surface to ensure the transmission of its rotary movement to a splined shaft which cooperates with the interior of the sleeve and could be capable of undergoing a movement of axial translation thereby producing a transmission device of variable length.

The invention will be understood better with reference to the ensuing description of some embodiments which are given solely by way of example and are shown in the accompanying drawings.

In the drawings:

FIGS. 7 and 8 are partial axial sectional views of the initial stage and final stage of the method for interconnecting a universal joint yoke collar and a tubular sleeve by a radial deformation of the collar which embeds splines of the sleeve in the smooth surface of the collar;

FIGS. 9 and 10 are partial axial sectional views of the initial and final stages of a method for obtaining from a blank both the collar and the embedding of splines in its outer surface;

FIG. 11 is a partial axial sectional view of a modification of the method illustrated in FIGS. 9 and 10 in which the forming of the collar and the rotational interconnection of the collar with the tubular sleeve are achieved simultaneously by a cold deformation;

FIG. 12 is a partial axial sectional view of a modification of the method illustrated in FIGS. 9 and 10 in which splines are produced on the outer surface of a collar pre-formed on a blank, and FIG. 13 is a partial axial sectional view of a modification of the method illustrated in FIG. 7 in which the collar is assembled with the tubular sleeve by embedding splines pre-formed on the outer surface of the collar in the smooth surface of the tubular sleeve.

Figure 1:
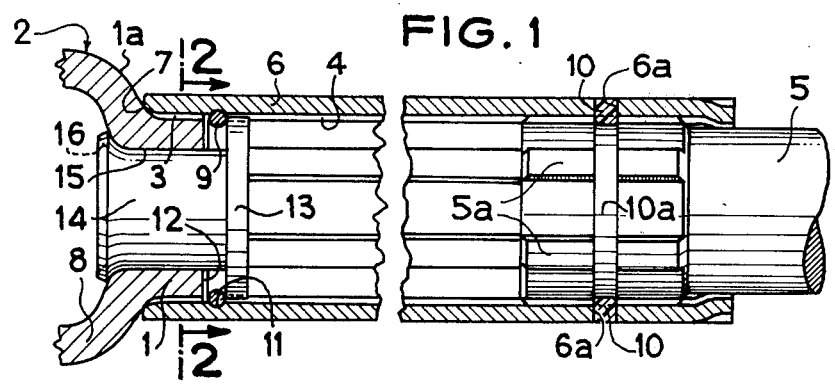
FIG. 1 is a longitudinal sectional view of one embodiment of a device according to the invention employing a universal joint yoke whose collar receives a plug which bears against a ring in the tubular sleeve.

In the transmission device shown in FIG. 1, the collar 1 of a universal joint yoke 2 has on its outer cylindrical surface splines 3 which cooperate with splines 4 formed on the inner surface of a tubular sleeve so that the latter is connected to rotate with the yoke 2. The yoke and the tubular sleeve 6 are also axially interconnected by means of a split elastically yieldable ring 9 which is engaged in a groove 11 in the inner surface of the tubular sleeve 6 and against which there axially bears — in the direction which applies the end edge 7 of the sleeve 6 against the outer surface 1a of the yoke 2 — a shoulder 13 formed at one of the ends of a plug 14 engaged in the collar 1. The other end of the plug 14 is formed over at 16 against the inner surface of the yoke 2.

Engaged in the tubular sleeve 6 is a shaft 5 whose splines 5a cooperate with the splines 4 of the sleeve 6 for transmitting torque between this shaft and the yoke 2. In the illustrated embodiment, the shaft 5 is a steering gear shaft which is retained axially by an anchoring 10 obtained by the injection of plastics material into radial orifices 6a in the sleeve 6 and into a circumferential groove 10a in the shaft 5 in facing relation to the radial orifices. The sliding of the shaft can only occur upon application of an axial force on the shaft which exceeds a predetermined threshold value for which the plastics material of the anchoring 10 is sheared.

The plug 14 is fitted with an interference fit in the bore 15 of the collar 1 so as to subject this collar to a radial pre-stressing which tends to improve the connection for rotation together ensured by the cooperating splines 3 and 4.

Figures 3, 4:
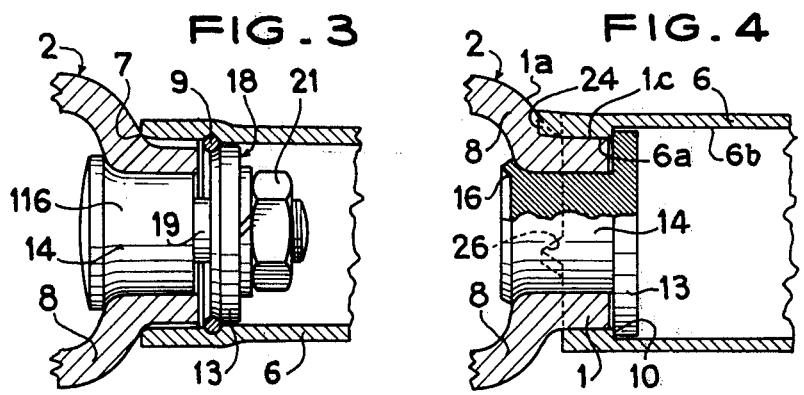
FIG. 3 is a partial axial sectional view of a modification of the plug.
FIG. 4 is a partial axial sectional view of a modification in which the tubular sleeve is embedded in the yoke.

In FIG. 3, the shoulder 13 is part of a ring 18 engaged around a screwthreaded part 19 of the plug 14 whose opposite end forms a continuous radial shoulder 16 which bears against the inner surface of the yoke 2. The screwing of a nut 21 on the end of the part 19 causes the shoulder 13 to be clamped against the ring 9 and thus urges the end edge 7 of the sleeve 6 in contact with the part 1a of the yoke 2.

In FIG. 4, the internal surface of the sleeve 6 has two smooth parts 6a, 6b of different diameters defining a shoulder 10. The part 6a which forms the end of the sleeve and is of smaller diameter is slidably engaged on the outer smooth surface 1c of the collar 1. The end portion of the tubular sleeve 6 has pointed teeth 24 which, under the effect of an axial thrust exerted for example on the tubular sleeve 6 and/or of a radial thrust exerted through the plug 14, are embedded in the outer surface 1a of the yoke 2 and form therein notches 26. Moreover, the shoulder 13 of the plug 14 bears axially against the shoulder 10 of the sleeve 6 which thus replaces the ring 9 shown in FIGS. 1 and 3.

Figures 5, 6:
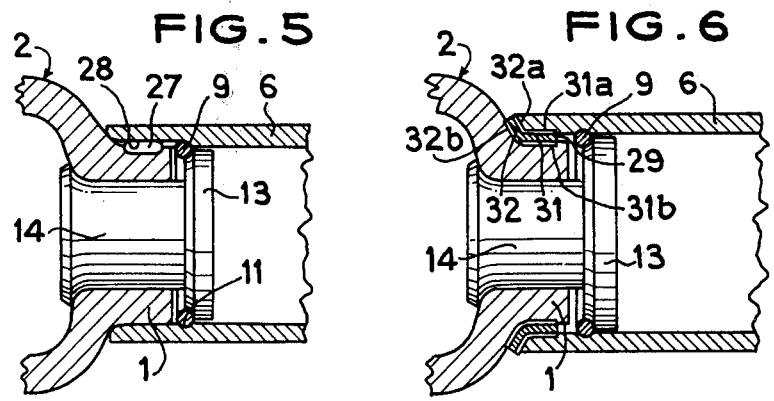
FIG. 5 is a partial axial sectional view of a modification in which the rotational interconnection is achieved by means of a needle embedded between the outer surface of the collar and the inner surface of the sleeve.
FIG. 6 is a partial axial sectional view of an embodiment in which the rotational interconnection is achieved by a washer comprising serrated or castellated surfaces embedded in corresponding surfaces of the yoke and tubular sleeve.

In FIG. 5, the collar 1 is connected to rotate with the tubular sleeve 6 by means of at least one attached intermediate member 27 disposed between the collar and the tubular sleeve, at least one of which latter two members may have splines. The cold deformation achieved in accordance with the invention permits the member 27 to be embedded in the course of the intimate interconnection of the collar and sleeve by the radial expansion of the collar.

Figure 2:
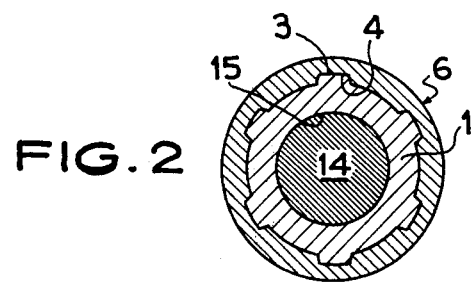
FIG. 2 is a sectional view taken on line 2—2 of FIG. 1.

In FIG. 6, the collar 1 and the tubular sleeve 6 are interconnected to rotate together by a washer 29 having a cylindrical portion 31 two faces of which are splined, serrated or castellated at 31a and 31b and a conical portion 32 also provided on its two faces with splines, serrations or castellations 32a, 32b. The splines formed on the two faces are embedded in corresponding initially-smooth surfaces of the sleeve 6 and the collar 1 under the effect, on one hand, of a radial expansion to which the collar is subjected, and, on the other, of the axial thrust exerted at the moment of assembly on the sleeve 6. The axial interconnection is ensured as in FIGS. 1 and 2 by means of a plug 14 and a ring 9.

It is also possible to dispose hard particles between the collar and the tubular sleeve which become embedded in the course of the radial deformation of the collar. The latter connecting means may be employed alone or in combination with those described and shown in FIGS. 1–6.

In the embodiment shown in FIGS. 7 and 8, the coupling means 2 is assembled with the tubular sleeve 6 by a cold deformation of the collar 1 which has initially an inside diameter less than in the final diameter and which undergoes a radial expansion under the effect of a punch 34 having a conical end portion 36 which facilitates its insertion in the collar 1 and a main cylindrical portion 37 whose diameter corresponds to the final inside diameter of the collar.

The radial expansion of the collar 1 permits simultaneously interconnecting, for rotation together and axially, the collar and the tubular sleeve 6, which is retained radially in the bore 39 of a structure 38, by means of internal splines 4 formed in the bore of the tubular sleeve 6 and a circular groove 41 machined in the latter in the region of the collar 1 so that, as can be seen in FIG. 8, the material of the collar is radially upset into this groove in the course of the expansion and forms a beading 42 while it receives the imprint of the splines 4 in the form of splines 3. The punch 34 advantageously includes at the end opposed to the conical portion 36 a divergent conical head 43 which limits the penetration of the punch into the collar 1. The punch 34 may be left inside the collar and thereby constitutes both a safety element maintaining the radial deformation of the collar and a closing plug for retaining lubricant within the sleeve/and in particular sealing off gases of the compartment of the vehicle when the universal joint yoke 2 is employed in the assembly of a steering column.

FIGS. 9 and 10 show the initial stage and the final stage of a method for cheaply forming an externally-splined collar 1 of a coupling means or yoke 2. There is employed a blank 46 of the coupling means in the approximate shape of tulip whose curved inner end 47 constitutes a dome having a centre aperture 48 and this inner end is put in contact with a die 49 having an inner bore 51 in which splines 52 are formed. By forcing inside the die 49 a punch 52 which is coaxial with the bore 51 and the aperture 48 and includes a main cylindrical portion 54 whose diameter is equal to the inside diameter of the collar to be obtained, there is produced a cold deformation of the inner end 47 which imparts thereto the desired cylindrical shape in contact with the splines 52 which are embedded in the outer surface of the cylindrical part of the collar obtained (FIG. 10). When it has been withdrawn from the die 49, the coupling means, whose collar has splines 3, is assembled with the tubular sleeve 6 shown in FIG. 1. As mentioned hereinbefore, this assembly is reinforced by the fitting of the expanding plug 14 which may, if desired, also act as a tool for forming the beading 42 (FIG. 8) ensuring an axial connection.

FIG. 11 shows a modification of the method illustrated in FIGS. 9 and 10, in which the die 49 is replaced by a tubular sleeve 6 having internal splines 39 and fitted inside the bore 56 of a structure 57 which radially maintains the sleeve 6. In this case, there is obtained the pre-forming of the collar 1 on the blank 46 and the interconnection for rotation together of the collar and the tubular sleeve 6, as in the embodiment shown in FIGS. 7 and 8. The use of a plug, which may be constituted by the punch itself as in the embodiment shown in FIG. 8, permits ensuring that the radial pre-stressing and the axial interconnection are maintained when the plug is blocked inside the sleeve as shown in FIGS. 1–4.

FIG. 12 corresponds to the case where the splines 52 of the die 49 are directly impressed or embedded, under the effect of the punch 53, into the outer smooth surface of the collar 57a which is pre-formed in a blank 57. The collar 57a could also be engaged in contact with the internally-splined sleeve 6 shown in FIG. 11.

FIG. 13 shows a modification of the method illustrated in FIG. 7 in which the tubular sleeve 6 has initially a smooth inner surface 6a, the outer surface of the collar 1 having splines 3 which, by radial expansion, are embedded in the surface 6a and form therein corresponding splines. In this embodiment, there is no groove 41 for forming bosses by the upsetting of the material of the collar. The axial interconnection, after the assembly has been disengaged from the punch and the die, is achieved in the same way as in FIG. 1, that is to say by a ring 9 inserted in a groove 11 of the sleeve 6, which groove is axially spaced from the collar 1 and by a plug 14 which is axially inserted in the collar, toward the left as viewed in the Figure, until its shoulder 13 comes in contact with the ring 9 and is finally axially retained in the opposite direction to that of its introduction by a radial forming over 16 of its end opposed to the shoulder 13. It will be observed that, instead of constituting a tubular tube as in the preceding embodiments, the sleeve 6 forms a cylindrical part of a structure 58 comprising a radial flange 59 which is in one piece with the cylindrical part 6. In this case, the die 38 is formed from a plurality of separable parts and, as indicated hereinbefore, the punch may be constituted by the plug which subsequently serves to ensure the axial interconnection.

It must be understood that the universal joint yoke 2 may be obtained from sheet metal or constitute a forged part or formed from a tube.

Having now described my invention what I claim as new and desire to secure by Letters Patent is:

1. A method for producing a transmission device comprising a coupling means, such as a universal joint yoke, having a collar adapted to be connected to a tubular sleeve, comprising producing a blank of the coupling means, forming a centre opening in the blank and forming a collar around the opening from a part of the blank surrounding the opening, cold forming projecting portions on an outer surface of said collar, and connecting the collar to the inside of said tubular sleeve by radially expanding said collar whereby said projecting portions on the outer surface of the collar interengage with projections on the inner surface of said sleeve.

2. A method as claimed in claim 1, wherein the projecting portions of the collar are formed by means of a die from which the collar is removed before connection to the sleeve.

3. A method as claimed in claim 1, wherein the sleeve has projecting portions pre-formed on an inner surface of the sleeve and the projecting portions of the collar are formed by contact of the collar with the projecting portions of the sleeve.

4. A method as claimed in claim 1, wherein the collar is pre-formed in the blank before putting the collar in contact with the sleeve.

5. A method as claimed in claim 1, wherein the cold formation of the projecting portions is achieved by forcing a tool through the opening of the blank and into means defining a bore which surrounds the collar.

6. A method as claimed in claim 1, wherein, in order to obtain an intimate connection between the sleeve and the collar, a plug is forced inside the collar which ensures a radial expansion of the collar and is left inside the collar.

7. A method as claimed in claim 1, wherein the tubular sleeve has splines on an inner surface and said part of the blank surrounding the opening is radially defomed within the sleeve so as to ensure the embedding of the splines in the outer surface of the collar formed from said part of the blank.

8. A method as claimed in claim 6, wherein the tubular sleeve has at least one circular groove into which groove the material of the coupling means is upset in the course of the radial expansion of the collar, thereby ensuring an axial interconnection of the sleeve and coupling means.

9. A method as claimed in claim 6, wherein the plug is axially retained in a part of the coupling means and also retained inside the sleeve by retaining means associated with the sleeve.

10. A method as claimed in claim 1, wherein the blank is obtained by a cold deformation of a thick sheet.

11. A method as claimed in claim 1, wherein the blank is obtained by forging.

12. A method as claimed in claim 1, wherein the blank is formed from a tube.

13. A method for producing a transmission device comprising a coupling means, such as a universal joint yoke, having a collar adapted to be connected to a tubular sleeve, comprising producing a blank of the coupling means, forming a centre opening in the blank and forming the collar around the opening from a part of the blank surrounding the opening, forming projectng portions on an outer surface of the collar, inserting the collar in the tubular sleeve which has a smooth inner surface and inserting a member inside the collar and radially expanding the collar against the smooth inner surface of the sleeve and thereby embedding the projecting portions in said inner surface of the sleeve.

14. A method as claimed in claim 13, wherein said deforming member is left fitted inside the collar after effecting the expansion.

* * * * *